United States Patent [19]
Mowry, Jr.

[11] Patent Number: 5,954,368
[45] Date of Patent: Sep. 21, 1999

[54] SECURITY DOCUMENT CONTAINING A NON-ORTHOGONAL ARRAY

[75] Inventor: William H. Mowry, Jr., Dayton, Ohio

[73] Assignee: The Standard Register Company, Dayton, Ohio

[21] Appl. No.: 08/751,968

[22] Filed: Nov. 19, 1996

[51] Int. Cl.$^6$ .................................................. B42B 15/00
[52] U.S. Cl. ............................................................ 283/93
[58] Field of Search ........................... 213/93, 94, 902, 213/72; 380/3, 51; 428/915, 916

[56] References Cited

U.S. PATENT DOCUMENTS

| | | |
|---|---|---|
| 4,210,346 | 7/1980 | Mowry, Jr. et al. . |
| 4,351,547 | 9/1982 | Brooks, II . |
| 4,579,370 | 4/1986 | Corwin et al. . |
| 5,149,140 | 9/1992 | Mowry, Jr. et al. . |
| 5,171,040 | 12/1992 | Orndorff . |
| 5,378,886 | 12/1994 | Tsuchiya ................................. 283/912 |
| 5,479,507 | 12/1995 | Anderson ................................ 283/902 |
| 5,487,567 | 1/1996 | Volpe . |

FOREIGN PATENT DOCUMENTS

| | | |
|---|---|---|
| 0 551 205 A1 | 7/1993 | European Pat. Off. . |
| 0551205 | 7/1993 | European Pat. Off. . |
| 2622840 | 5/1989 | France . |
| 3424156 C2 | 10/1995 | Germany . |
| 2040224 | 8/1980 | United Kingdom . |

*Primary Examiner*—Willmon Fridie, Jr.
*Attorney, Agent, or Firm*—Killworth, Gottman, Hagan & Schaeff, L.L.P.

[57] ABSTRACT

A security document is provided comprising a substrate having a top surface for carrying printed indicia. Background printed matter is printed on the top surface. The background printed matter is made up of a pattern of background elements. A security term is also printed on the top surface of the substrate. The security term is composed of a pattern of security term elements. The background elements or the security term elements, or both, are organized in a non-orthogonal, repetitive pattern. Also, either the background elements or the security term elements are not readily duplicated by a color copier while the other elements are readily duplicated by a color copier. This results in a visually perceptible security term being produced upon a copy of the security document. The security document is "imaging friendly."

17 Claims, 9 Drawing Sheets

SECURITY DOCUMENT CONTAINING A NON-ORTHOGONAL ARRAY

BACKGROUND OF THE INVENTION

The invention is directed towards an improved security document and, more particularly, to a security document having a non-orthogonal array as the underlying location pattern for image elements.

Color photocopiers have been used for years to make accurate copies of commonly available documents. In many cases, there are legitimate reasons for making such copies. Unfortunately, color copies may also be made and used for illegal purposes. Specifically, there has been concern that color copiers could be used to reproduce security documents, such as checks, stock certificates, automobile title instruments, birth certificates, college transcripts, prescriptions, and other documents of value, for illegal purposes.

Many techniques have been developed to prevent improper reproduction of security documents. One of the most successful is the use of a hidden warning message which is readily apparent on reproduced copies of a document, but which is invisible, or nearly so, on the original document. While this does not actually prevent a copy from being made, it does make it apparent that the copy is not the original document.

Many techniques have been used to produce this effect. One technique is shown in U.S. Pat. No. 4,227,720. This patent discloses using small dots in a conventional orthogonal halftone dot array as background elements, while larger dots in a similar orthogonal halftone dot array are used to form a warning word. A single tone warning phrase and a single tone background pattern are used. Tone refers to the visual effect produced by solid ink coverage or by halftone dots, bars, marks, or other elements which cover a portion of a printed area and which usually have a frequency that is measured in dots, lines, marks, or other elements per inch. Halftone dots, bars, marks, or other elements printed with a dark ink may be more or less uniformly distributed over an area to produce the visual effect of a lighter overall color than the color of the ink. Printing an image with less than full area coverage is said to be printing less than a full tone image. The warning phrase and background pattern area tones are of different frequency and are made up of dots, bars, or marks of differing size, but they are selected to provide similar appearance to the eye of a casual observer. A less than full tone effect may also be produced by full area coverage of a paler color of ink than the darker color of ink used for the halftone dots, bars, or marks.

Because the tone of the warning phrase and the tone of the background pattern are selected to be generally the same, these two areas have much the same visual impact on an observer of the original document, and the warning phrase is not readily perceived. The optics of color copiers have typically been unable to reproduce relatively small halftone dots, lines or other elements. As a consequence, reproduced copies of the original document will have a noticeable warning phrase.

As taught in the '720 patent, a camouflage pattern is often utilized to obscure the warning phrase further. The camouflage pattern may be defined by areas in which the dots, bars, or marks have been deleted from both the warning phrase and the background pattern. The camouflage pattern may also be defined by a pattern of dots, bars, or marks which are smaller than or larger than those used in the background pattern and the warning phrase, or by areas of complete coverage of a paler ink. The camouflage pattern confuses the eye of the casual observer so that the warning phrase is not readily apparent, even if the tone of the warning phrase and the tone of the background pattern differ somewhat.

In recent years, color copiers have been improved substantially, and these improvements have made the above techniques less effective in protecting documents. By manipulating the control settings on improved copiers, copies can be made of documents carrying a hidden warning phrase in which the warning phrase does not appear on reproductions when some of the most commonly used frequency and size combinations are used. For example, by adjusting the settings for sharpness and lightness/darkness it has still been possible on some copiers for a skilled operator to produce a copy in which the warning phrase is not visible. Furthermore, different orientations of the document on a copier can affect the visibility of a warning phrase on the resulting copy. This is especially true when halftone lines are used instead of dots.

Therefore, there remains a need in the art for a security document which provides improved protection against copying over a wide range of copier settings and document orientations.

SUMMARY OF THE INVENTION

This need is met by the present invention whereby an improved security document is provided. The present invention uses background elements or security term elements, or both, organized in a non-orthogonal, repetitive pattern. This results in an improved security document because it produces an arrangement of elements that is scanned consistently regardless of the orientation of the document on a copier.

In accordance with one aspect of the present invention, a security document is provided. The security document comprises a substrate having a top surface for carrying printed indicia. Background printed matter is printed on the top surface. The background printed matter is made up of a pattern of background elements. A security term is also printed on the top surface of the substrate. The security term is composed of a pattern of security term elements. The background elements or the security term elements, or both, are organized in a non-orthogonal, repetitive pattern. Also, either the background elements or the security term elements are not readily duplicated by a color copier while the other elements are readily duplicated by a color copier. This results in a visually perceptible security term being produced upon a copy of the security document.

Preferably, the background elements or the security term elements, or both, of the security document are organized as the apexes of a plurality of geometric shapes selected from the group consisting of triangles, pentagons, hexagons, septagons, or octagons.

Preferably, the background elements or the security term elements, or both, of the security document are organized as the apexes of a plurality of approximately equilateral hexagons.

Preferably, the security term is a cancellation term. Also, the security document preferably has a camouflage pattern on the top surface. More preferably, the camouflage pattern is produced by eliminating elements from the background printed matter and the security term. Most preferably, the camouflage pattern is further defined by a pattern of camouflage elements.

Preferably, the background printed matter is made up of a pattern of background elements of substantially the same size. Also, preferably the security term is made up of a pattern of security term elements of substantially the same size.

In a preferred embodiment, each security term element and each background element is a printed dot, a cluster of dots, or a line segment. More preferably, each background element is a printed dot. Most preferably, each security term element is a printed dot.

Preferably, the sizes of the background elements and the security term elements, the positions of the background elements and the security term elements, or both the sizes and the positions are varied to produce a graded screen.

In accordance with a second aspect of the present invention, a security document is provided. The security document comprises a substrate having a top surface for carrying indicia. The top surface has background printed matter. The background printed matter is made up of a pattern of background elements. The top surface also contains a security term. The security term is composed of a pattern of security term elements. The top surface is arranged as an array having points at the apexes of a plurality of approximately equilateral triangles. Most of the points have a background element located thereon. The background elements are only present on the points. Also, either the background elements or the security term elements are not readily duplicated by a color copier while the remaining elements are readily duplicated by a color copier. This results in a visually perceptible security term being produced upon a copy of the security document.

In a preferred embodiment, every point has a background element located thereon. In another preferred embodiment, the background elements are organized as the apexes of a plurality of approximately equilateral hexagons.

Preferably, the security term is a cancellation term. Also, the security document preferably has a camouflage pattern on the top surface. More preferably, the camouflage pattern is produced by eliminating elements from the background printed matter and the security term. Most preferably, the camouflage pattern is further defined by a pattern of camouflage elements.

Preferably, the background printed matter is made up of a pattern of background elements of substantially the same size. Also, preferably the security term is made up of a pattern of security term elements of substantially the same size.

In a preferred embodiment, each security term element and each background element is a printed dot, a cluster of dots, or a line segment. More preferably, each background element is a printed dot. Most preferably, each security term element is a printed dot.

Preferably, the sizes of the background elements and the security term elements, the positions of the background elements and the security term elements, or both the sizes and the positions are varied to produce a graded screen.

In accordance with a third aspect of the present invention, a security document is provided. The security document comprises a substrate having a top surface for carrying indicia. The top surface has background printed matter. The background printed matter is made up of a pattern of background elements. The top surface also contains a security term. The security term is composed of a pattern of security term elements. The top surface within the security term is arranged as an array having points at the apexes of a plurality of approximately equilateral triangles. Most of the points have a security term element located thereon. The security term elements are only present on the points. Also, either the background elements or the security term elements are not readily duplicated by a color copier while the remaining elements are readily duplicated by a color copier. This results in a visually perceptible security term being produced upon copying of the security document.

In a preferred embodiment, the security term elements are organized as the apexes of a plurality of approximately equilateral triangles. In another preferred embodiment, the security term elements are organized as the apexes of a plurality of approximately equilateral hexagons.

Preferably, the security term is a cancellation term. Also, the security document preferably has a camouflage pattern on the top surface. More preferably, the camouflage pattern is produced by eliminating elements from the background printed matter and the security term. Most preferably, the camouflage pattern is further defined by a pattern of camouflage elements.

Preferably, the background printed matter is made up of a pattern of background elements of substantially the same size. Also, preferably the security term is made up of a pattern of security term elements of substantially the same size.

In a preferred embodiment, each security term element and each background element are a printed dot, a cluster of dots, or a line segment. More preferably, each background element is a printed dot. Most preferably, each security term element is a printed dot.

Preferably, the sizes of the background elements and the security term elements, the positions of the background elements and the security term elements, or both the sizes and the positions are varied to produce a graded screen.

In accordance with a fourth aspect of the present invention, a method for producing a security document which is conducive to imaging is provided. The method comprises providing a substrate having a top surface for carrying printed indicia. Background printed matter is printed on the top surface. The background printed matter is made up of a pattern of background elements. A security term is also printed on the top surface of the substrate. The security term is composed of a pattern of security term elements. The background elements or the security term elements, or both, are organized in a non-orthogonal, repetitive pattern. Also, either the background elements or the security term elements are not readily duplicated by a color copier while the other elements are readily duplicated by a color copier. This results in a visually perceptible security term being produced upon a copy of the security document. Also, when the document is imaged with an imaging device the background elements and the security term elements do not interfere with the imaging device.

In accordance with a fifth aspect of the present invention, a security document is provided. The security document comprises a substrate having a top surface for carrying printed indicia. Background printed matter is printed on the top surface. The background printed matter is made up of a pattern of background elements. A security term is also printed on the top surface of the substrate. The security term is composed of a pattern of security term elements. A camouflage pattern is printed on the top surface. The camouflage pattern is defined by a pattern of camouflage elements located in areas on the top surface in which there are no background elements or security term elements. Also, either the background elements or the security term elements are not readily duplicated by a color copier while the other elements are readily duplicated by a color copier. This results in a visually perceptible security term being produced upon a copy of the security document.

Accordingly, it is an object of the present invention to provide an improved security document in which copier settings and document orientation have little effect on the effectiveness of the security term. Other objects and advantages of the invention will be apparent from the following description, the accompanying drawings and the appended claims.

DETAILED DESCRIPTION OF THE PREFERRED EMBODIMENTS

Figure 1:
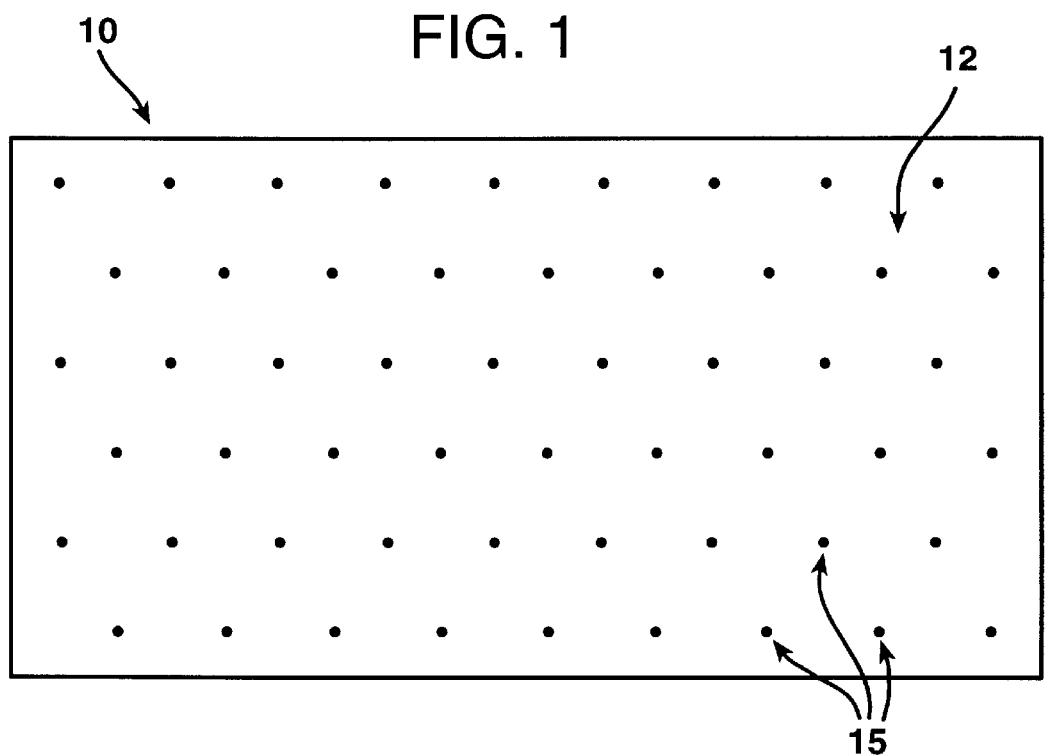
FIG. 1 is a schematic representation of a background of a security document according to the present invention.

The present invention is an improvement over past security documents in that it provides a security document having an array of elements that is less sensitive to copier setting variations and document orientation on the copier. This is accomplished by placing elements in a manner such that a copier will scan the spacing between elements generally consistently, regardless of document orientation on the copier platen and copier settings.

Modern color copiers reproduce a document by breaking up the document surface into an array of small areas, termed pixels, and sampling the image density and color in each such pixel. If the copier optics indicate that an element is present within a pixel area on the original document, the corresponding pixel area is printed on the copy. A problem experienced with current security documents is that a grid-shaped array will be read differently at different settings of the copier and orientations of the original document. Sometimes a single element will be copied by printing a single pixel. Other times, the same element will be copied by printing multiple pixels. This allows an operator attempting to bypass the hidden security term to vary the amount certain elements will appear on the copy.

For example, for a given document, a copier will read partial elements in a pixel area. As the "darkness" setting is increased on the copier, the sensitivity of the copier to these partial elements increases. At a certain level, the copier will print a pixel on the copy corresponding to a pixel on the original document in which a partial element was scanned. Therefore, the significance of small and partial elements will increase disproportionately in relation to larger elements at darker copier settings. Such a situation allows for copy manipulation and the defeat of some security terms.

The present invention seeks to reduce the effectiveness of such manipulation by providing a document with non-orthogonal, repetitive elements. Elements organized in such a manner are less sensitive to document orientation than the current grid-shaped, orthogonal arrays. Non-orthogonal shapes (shapes which are not rectangular), such as triangles, pentagons, hexagons, septagons, and octagons, more closely approximate a circular shape than orthogonal arrays. Therefore, these shapes are less sensitive to rotation of the document on a copier.

It is also beneficial for elements to be repetitive. The term "repetitive" refers to a particular pattern of elements being used repeatedly on a document. This allows for a more uniform background image than an image produced by non-repetitive elements.

The present invention also seeks to reduce the effectiveness of document manipulation on a copier by controlling the number of elements within a given pixel scanning area. This is achieved by using an array which has points at the apexes of a plurality of approximately equilateral triangles. Such an array is much less sensitive to document orientation than the current grid-shaped arrays.

Preferably, the spacing between points in the array of the present invention is calculated as a function of the pixel size of a copier. This enables the security document designer to determine the number of elements that will fall within a pixel scanning area. By using this ability to create a "buffer zone" around each element, the security document designer can increase the likelihood that only one pixel will fire for a given element, regardless of copier settings or document orientation.

For example, it would be useful to size a background element so that it is effectively about one pixel area, and to place it so that the "nearest neighbor" pixels will be white paper or an area including a negligible amount of image from nearby elements. The placement can be adjusted to permit various amounts of white space between the elements. A preferred spacing is the equivalent of the width of two copier scanning pixels. A copier scanning pixel on a copier with a 400 element per inch scanning resolution is estimated to be about 0.0025 inch by 0.0025 inch. Therefore, a spacing of two copier pixels would be 2×0.0025 inch. Other preferred spacings are 2.5×0.0025 inch (2.5 pixels) and 3×0.0025 inch (3 pixels). Larger element to element spacings may require larger element diameters to give an adequate density to the printed background.

Figure 10:
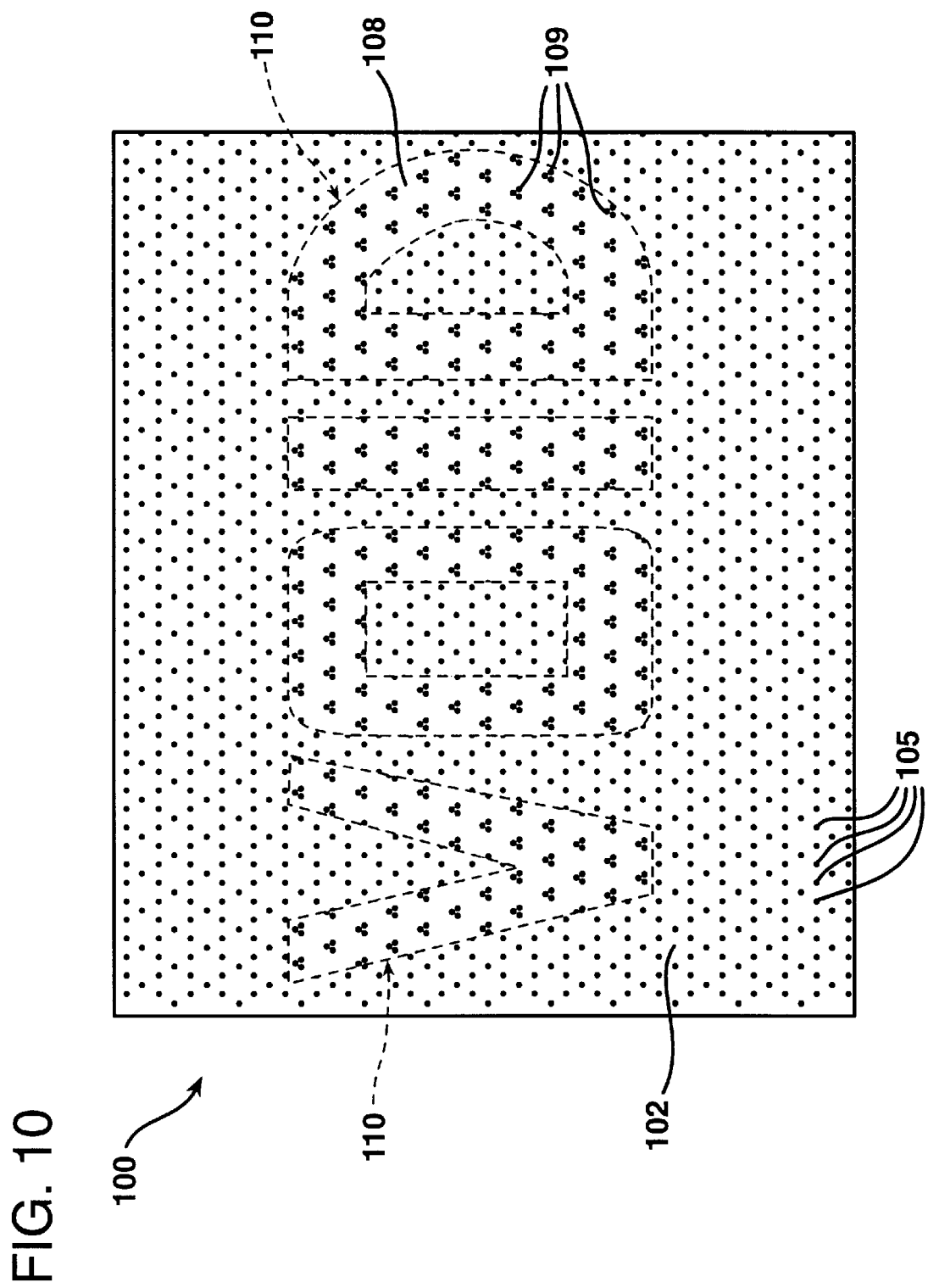
FIG. 10 is a schematic representation of a security document according to the present invention.

Reference is made to FIGS. 1, 2, 3, 5, 6 and 7 which illustrate various backgrounds for security documents according to the present invention. Reference is also made to FIGS. 4 and 10, which illustrate security documents according to the present invention. It will be appreciated that the documents shown in FIGS. 1–7 and 10 are depicted diagrammatically and are not drawn to scale.

In FIG. 1, a background 10 is shown. The background 10 contains background printed matter 12, made up of background elements 15. The background elements 15 are shown as dots, but if desired could consist of lines, bars, other elements, or clusters of elements. The background elements 15 are arranged as the apexes of a plurality of approximately equilateral triangles.

Figure 2:
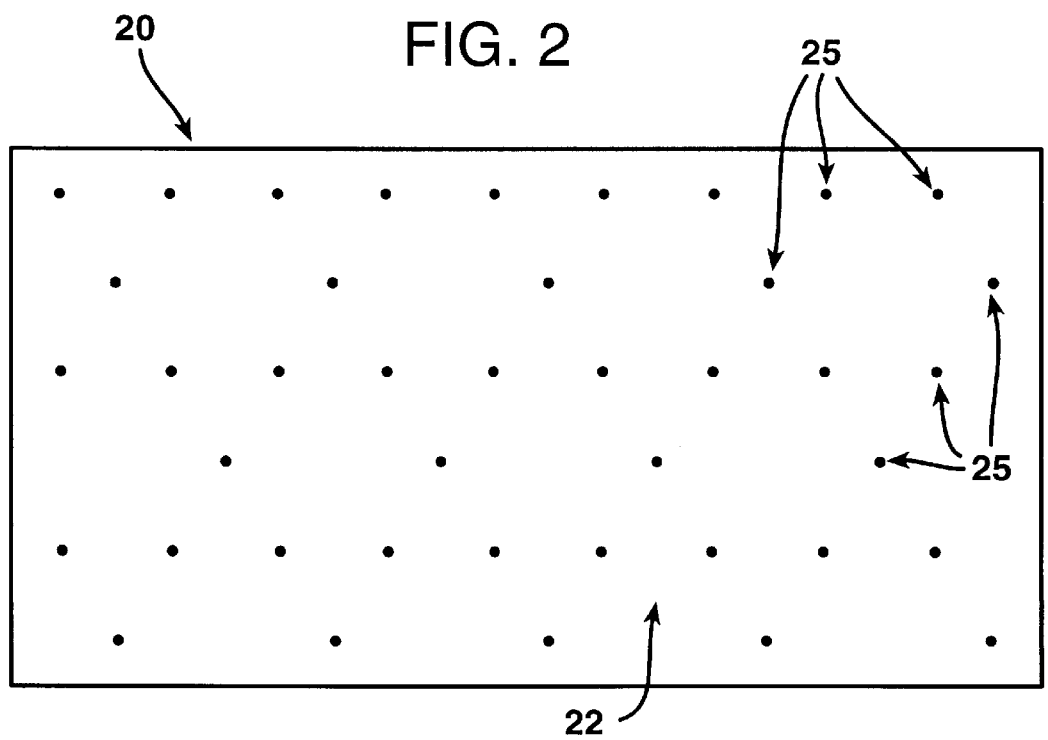
FIG. 2 is a schematic representation of a background of a security document according to the present invention.

In FIG. 2, a background 20 is shown. The background 20 contains background printed matter 22, made up of background elements 25. The background elements 25 are shown as dots, but if desired could consist of lines, bars, other elements, or clusters of elements. The background elements 25 are arranged as the apexes of a plurality of approximately equilateral hexagons.

Figure 3:
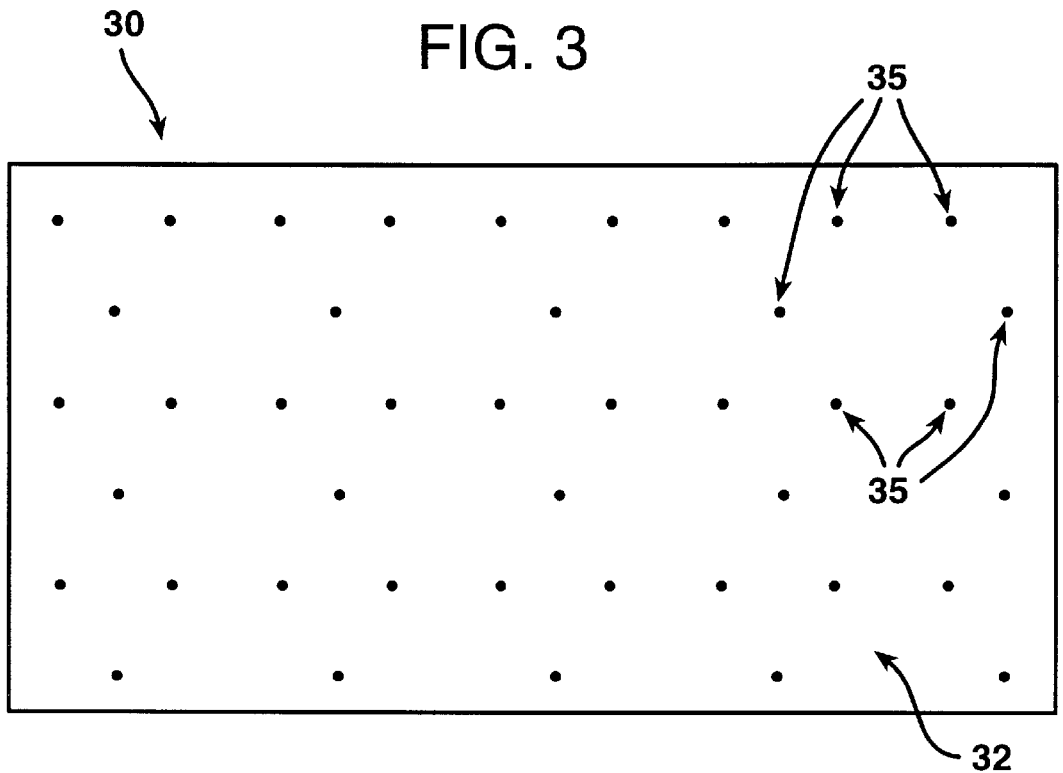
FIG. 3 is a schematic representation of a background of a security document according to the present invention.
Figure 4:
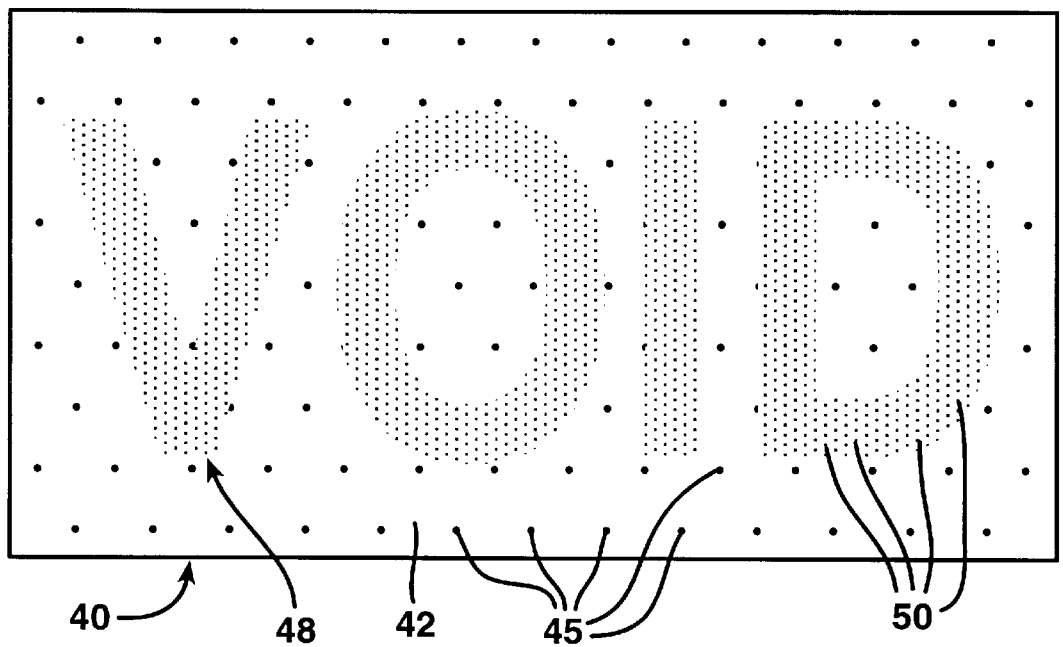
FIG. 4 is a schematic representation of a security document according to the present invention.

In FIG. 3, a background 30 is shown. The background 30 contains background printed matter 32, made up of background elements 35. The background elements 35 are shown as dots, but if desired could consist of lines, bars, other elements, or clusters of elements. The background elements 35 are arranged as the apexes of a plurality of approximately equilateral hexagons. The background elements in background 20 and background 30 are both arranged as the apexes of a plurality of approximately equilateral hexagons. However, the overall pattern of background elements 35 in background 30 is different from the overall pattern of background elements 25 in background 20.

In FIG. 4, a security document 40 is shown. The security document 40 contains background printed matter 42, made up of background elements 45. The background elements 45 are shown as dots, but if desired could consist of lines, bars, other elements, or clusters of elements. The background elements 45 are arranged as the apexes of a plurality of approximately equilateral triangles. The security document 40 also contains security terms 48, indicating the word "VOID," made up of security term elements 50.

Figure 5:
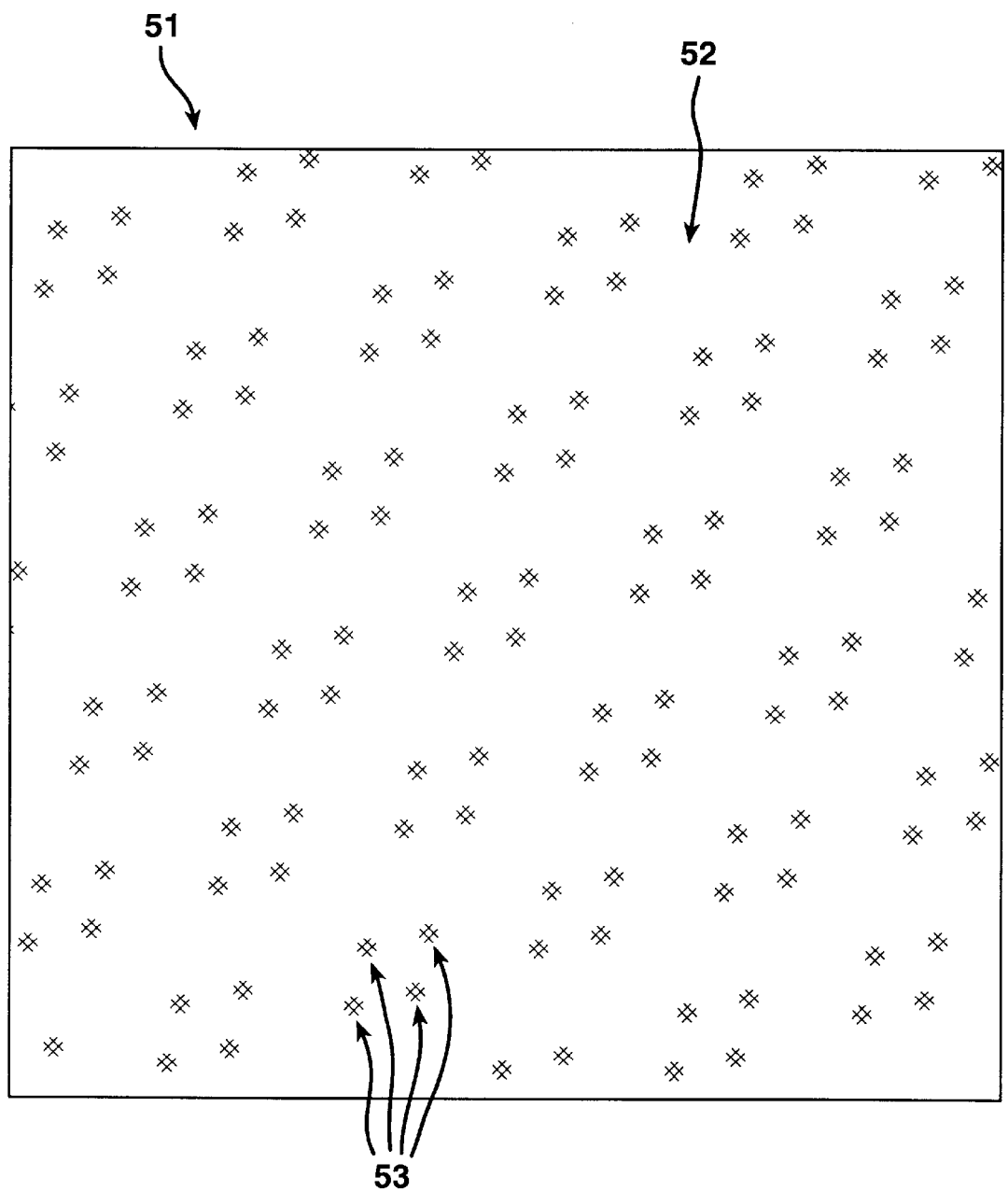
FIG. 5 is a schematic representation of a background of a security document according to the present invention.

In FIG. 5, a background 51 is shown. The background 51 contains background printed matter 52, made up of background elements 53. The background elements 53 are shown as small crosses with white dots, but if desired could consist of dots, lines, bars, other elements, or clusters of elements. The background elements 53 are arranged as non-orthogonal parallelograms. The centers of the parallelograms are on points arranged as the apexes of a plurality of approximately equilateral triangles.

Figure 6:
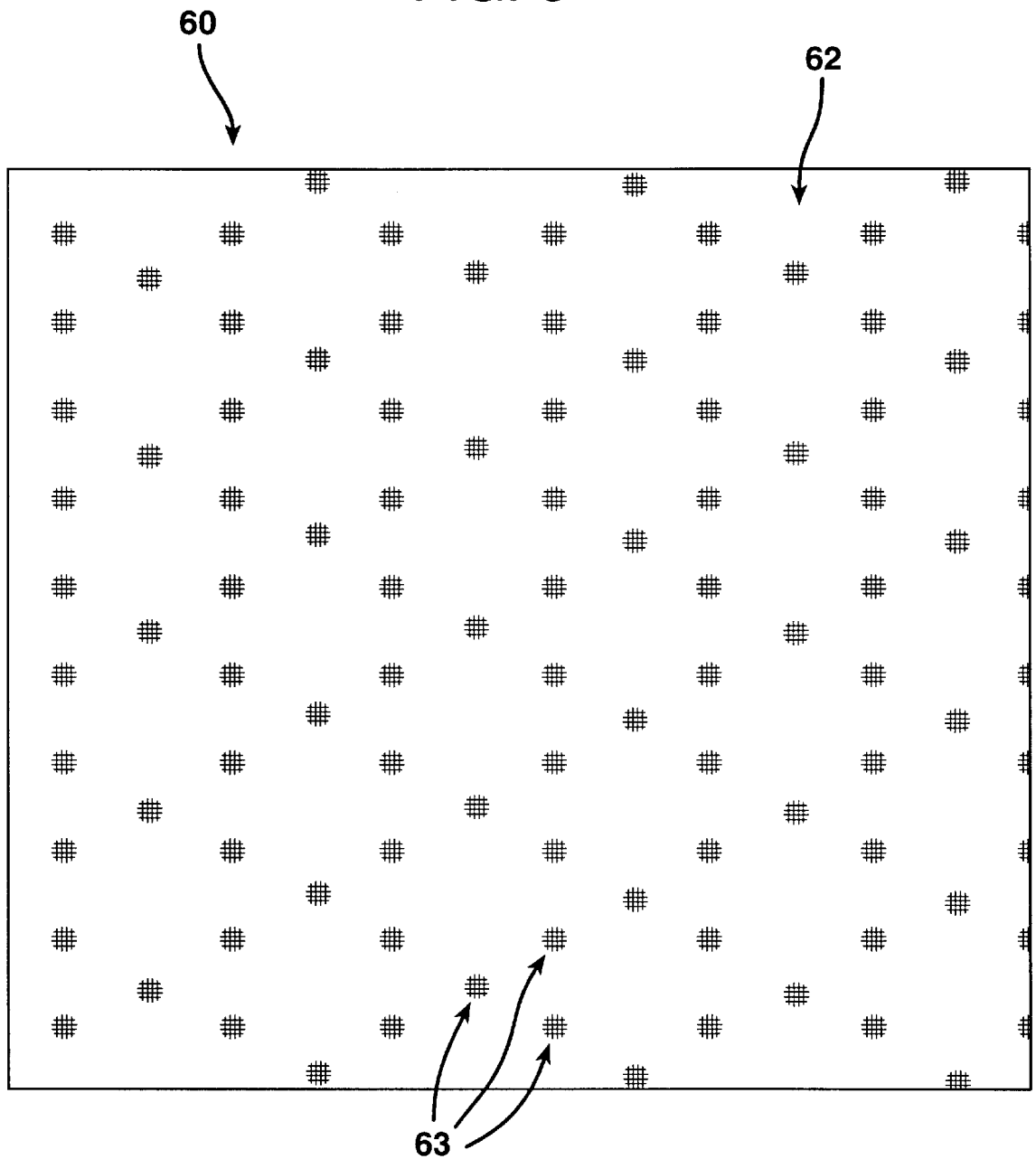
FIG. 6 is a schematic representation of a background of a security document according to the present invention.

In FIG. 6, a background 60 is shown. The background 60 contains background printed matter 62, made up of background elements 63. The background elements 63 are shown as small crosses with white dots, but if desired could consist of dots, lines, bars, other elements, or clusters of elements. The background elements 63 could also consist of elements having internal structure. The background elements 63 are arranged as an interconnecting plurality of hexagons.

Figure 7:
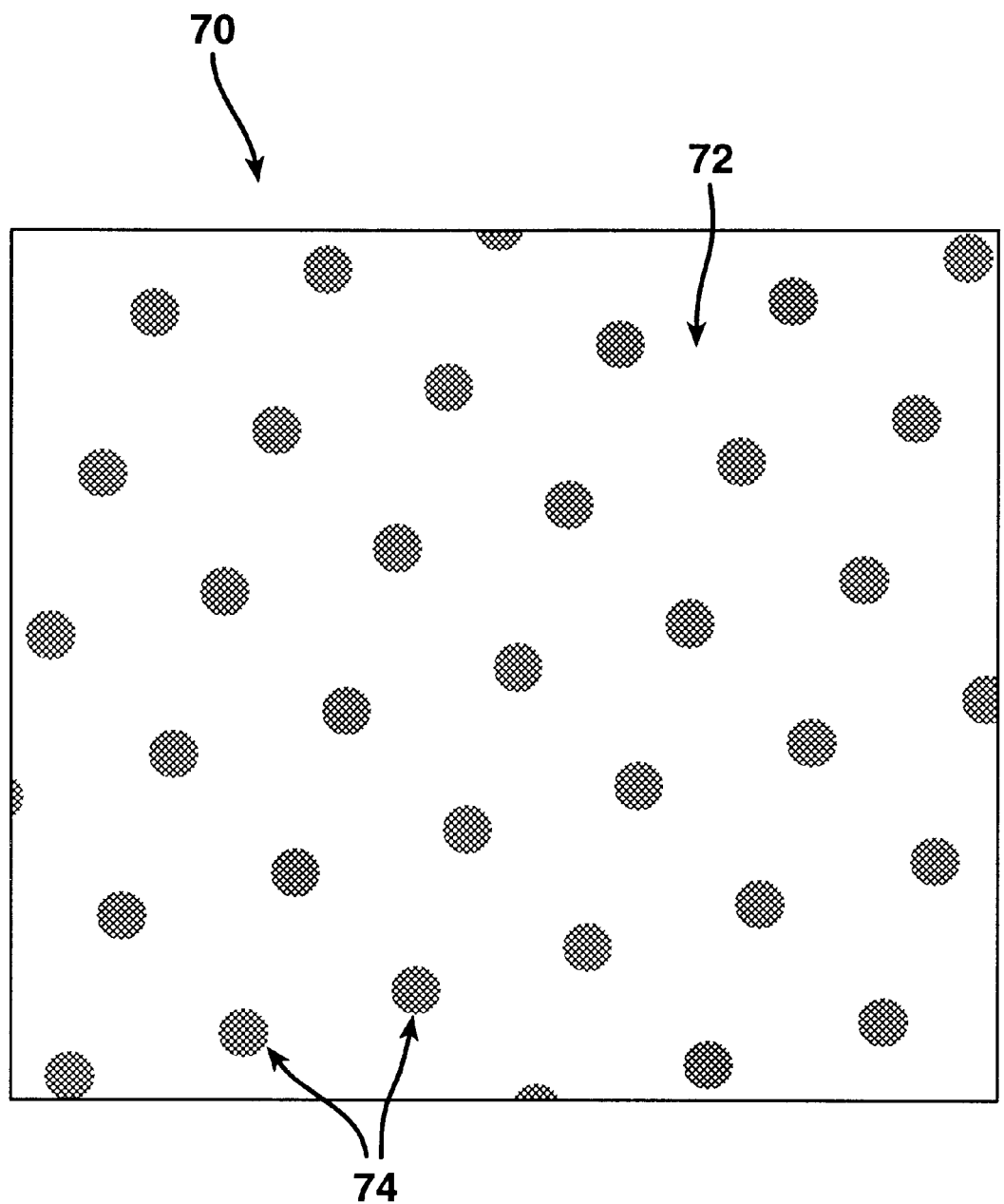
FIG. 7 is a schematic representation of a background of a security document according to the present invention.

In FIG. 7, a background 70 is shown. The background 70 contains background printed matter 72, made up of background elements 74. The background elements 74 are shown as clusters of black dots, but if desired could consist of dots, lines, bars, or other elements. The background elements 74 are arranged so that the centers of the clusters are located on the apexes of a plurality of approximately equilateral triangles.

In FIG. 10, a security document 100 is shown. The security document 100 contains background printed matter 102, made up of background elements 105. The background elements 105 are shown as dots, but if desired could consist of lines, bars, other elements, or clusters of elements. The background elements 105 are arranged as the apexes of a plurality of approximately equilateral hexagons. The security document 100 also contains security terms 108, indicating the word "VOID," made up of security term elements 109. The security term elements 109 are arranged as the apexes of a plurality of approximately equilateral triangles. Also, dotted lines 110 are used to accentuate the security terms 108. The dotted lines 110 are used for the purposes of illustration only. The dotted lines 110 are preferably not present on a security document according to the present invention. The security term elements 109 are shown as clusters of dots, but if desired could consist of dots, lines, bars, or other elements. FIG. 10 demonstrates that non-orthogonal arrays can be used for both the background elements and the security term elements of the present invention.

Figure 11:
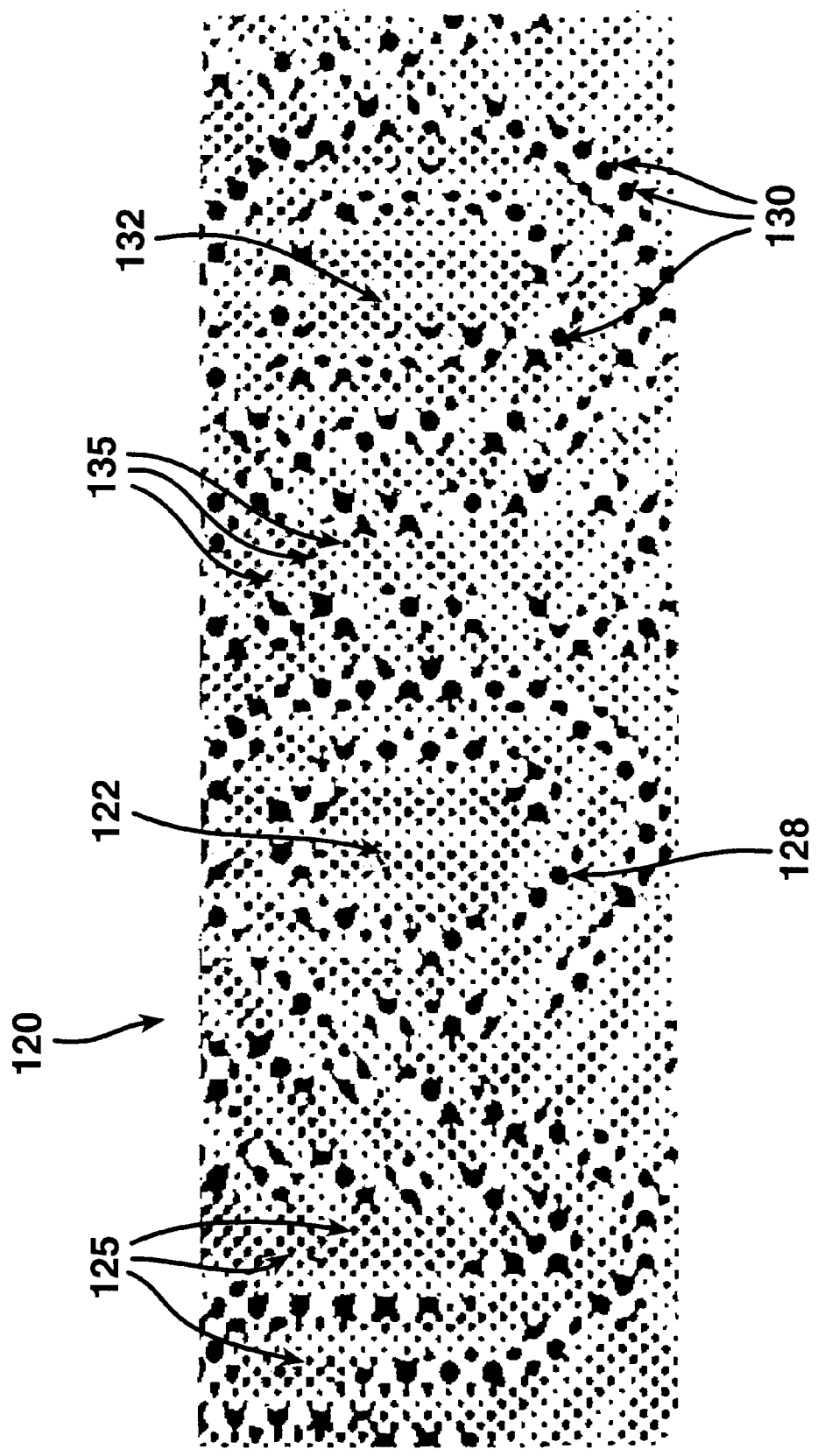
FIG. 11 is an enlarged view of a sample containing a camouflage pattern according to the present invention.

In FIG. 11, an enlarged view of a security document 120 is shown. The view is approximately 600 times larger than the actual sample. The security document 120 contains background printed matter 122, made up of background elements 125. The background elements 125 are shown as dots, but if desired could consist of lines, bars, other elements, or clusters of elements. The background elements 125 are arranged in a conventional orthogonal array. The security document 120 also contains a security term 128, indicating the word "VOID," made up of security term elements 130. The security term elements 130 are arranged in a conventional orthogonal array. The security term elements 130 are shown as dots, but if desired could consist of lines, bars, other elements, or clusters of elements. In addition, the security document 120 contains a camouflage pattern 132, made up of camouflage elements 135. The camouflage elements 135 are shown as dots, but if desired could consist of lines, bars, other elements, or clusters of elements. The camouflage elements 135 are arranged in a conventional orthogonal array. FIG. 11 demonstrates a camouflage pattern 132 according to the present invention in which background elements 125 and security term elements 130 are not printed in certain areas to form the shape of the camouflage pattern 132. These areas may not have elements of any type printed therein. Alternatively, the camouflage pattern 132 may be further defined by camouflage elements 135. The camouflage elements 135 are smaller than either the background elements 125 or the security term elements 130.

A variety of shapes for the background elements and security term elements are shown in the figures. In addition, many other shapes may be used. Specific various shapes of the background and security term elements include printed dots (both large dots and small dots), clusters of dots, circles (a dot with a hole in the middle), line segments, triangles, rectangles, curves, swirls, and other geometric shapes. When clusters of elements are used, the center of the cluster is preferably used for positioning purposes. Also, the shape of the background elements can differ from the shape of the security term elements. Examples of various relationships between the background elements and the security term elements include:

| Background elements | Security Term Elements |
| --- | --- |
| Large dot | Small dot |
| Small dot | Large dot |
| Line segment | Small dot |
| Line segment | Large dot |
| Small dot | Line segment |
| Large dot | Line segment |
| Line segment | Line segment |
| Large dot | Circle |
| Small dot | Circle |
| Circle | Small dot |
| Circle | Large dot |

The figures show several embodiments of the present invention in which the background elements are organized in a non-orthogonal, repetitive pattern. However, the present invention also encompasses documents in which the security term elements are organized in a non-orthogonal, repetitive pattern, while the background elements are not organized in such a manner. In addition, the present invention encompasses documents in which both the security term elements and the background elements are organized in non-orthogonal, repetitive patterns.

The coverage of the background printed matter and the security term on the surface of the document may vary from 3 percent area coverage to 50 percent area coverage. Preferably, coverages of 10 to 15 percent are used. The percent coverage of the background printed matter and the percent coverage of the security term on the surface of the document may be the same, or the percent coverages may differ.

Percent area coverage differentials between the background printed matter and the security term can make the security term more noticeable on a photocopy without excessive visibility on the original. Preferably, such a difference in the percent coverages is small to reduce the likelihood that the security term will be noticed. For example, one useful combination would be a percent area coverage of 15% for the security term and 10% for the background printed matter. The small percent coverage difference will tend to make the security term more obvious on a photocopy. If desired, a camouflage image may be used to make security terms less apparent on the original security document. The camouflage image may be defined by a printed pattern of ink, or by a pattern produced by eliminating elements from the background printed matter and the security term.

Additionally, a camouflage image may be produced by not printing elements from the background printed matter and the security term in certain areas and then filling these areas with additional elements ("camouflage elements"). Preferably, the camouflage elements are significantly smaller than either the background elements or the security term elements (see FIG. 11). Elements such as dots, lines, bars, or clusters of elements may be used in the camouflage pattern. The percent area coverage of the camouflage elements may vary from 0 to less than 100 percent. Preferably, the percent area coverage of the camouflage elements is close to the percent area coverage of the background elements. This produces a more uniform background. When a uniform background is passed through a scanning machine, it produces less digitized information than a non-uniform background. As a result, an electronic record of a uniform background requires less storage space than the electronic record of a non-uniform background. Therefore, a uniform background is preferred because it is more conducive to imaging.

Elements shaped as line segments will have an angular orientation with respect to the security document. Preferably, line segments are oriented at 0, 15, 30, 45, 60, 75, 90, 105, 120, 135, 150, or 165 degrees to the horizontal axis of the security document, but any angular orientation may be used.

The tone of the security document may be a uniform tone over the document surface. In this embodiment, the percent coverage of the document may have different values for the security term and the background printed matter, but the field will appear constant to a casual observer. Alternatively, the surface of the security document may use a graded or graduated screen. In such an embodiment, for example, the frequencies of the background elements and the security term elements may remain the same, while the size of the elements is varied across the document. As an example, the frequency might be 130 lines per inch and 65 lines per inch for the background elements and the security term elements, respectively. The size of the background elements may vary across the document so that the percent area coverage varies from 30% of the area covered to 3%, and the size of the security term elements may vary across the document so that the coverage varies from 49% to 4% of the area covered. For example, the highest percentages of coverage may be at the top of the security document. These percentages are then gradually reduced toward the bottom of the document. This change in coverage percentages may occur in steps, producing bands of slightly differing tone. If desired, however, the size of the elements or the frequency of the elements, or both, may be continuously varied over the document surface. Regardless of the manner in which the size of the background elements and the size of the security term elements are varied, the selection of element sizes for a given area on the document is made such that they provide generally equal tone. The tones may differ more if a camouflage image is used.

Security terms on the surface of the document may take the form of a single warning word, such as "VOID." Alternatively, the security term may be in the form of multiple warning words. It should be understood that the phrase "security term" is intended to include not only words, such as the word "VOID" shown in the drawings, but also words and phrases which simply make evident to an observer that the document being inspected is a copy of the original document. Such phrases as "PHOTOCOPY", "COPY", and "DUPLICATE" may be used for this purpose. Also intended to be included within the phrase "security term" are words or symbols which may signify to the individual making the copy that the original document is authentic.

It should be appreciated that the phrase "cancellation term" is intended to include words, such as the word "VOID" shown in the drawings, symbols, such as "Ø", and phrases, such as "UNAUTHORIZED COPY," which make evident to an observer that the document being inspected is a copy of the original document and that the copy is not authentic.

It should be understood that any of a wide variety of camouflage images may be utilized in this fashion to disguise the cancellation terms on a security document according to the present invention. For a camouflage to be effective, the camouflage image usually occupies about 50% of the document surface area. However, as the differences between the security term and the background are reduced, the camouflage can also be reduced. Therefore, the camouflage image may occupy less then 50% of the document surface area. A properly configured camouflage image becomes the dominant image in the eye of the casual observer. A camouflage image may be defined by the absence of elements within the image area and/or by the presence of further printed elements. Elements which are affected to define a camouflage image may be wholly or partially removed. Partial removal of an element results in a portion of the element being completely removed.

It should be appreciated that the term "array" describes an organized layout of image elements in areas of approximately equal size. The term "point" refers to a point in the mathematical sense (a dimensionless geometric object having no property but location). The phrase "readily duplicated" is defined as being capable of being reproduced with or without distortion of the image.

In one aspect of the present invention, an array has points at the apexes of a plurality of approximately equilateral triangles. Elements, or the centers of clusters of elements, are placed on most of these points. It should be appreciated that the term "most" refers to more than fifty percent of the elements being located on the points.

The present invention has utility in the area of "imaging friendly" documents. Imagers are scanning machines used by some financial institutions and other businesses to record digitally the image of security documents, such as checks. The scanned information can be stored and used later to reproduce an image of the scanned document if needed. This allows the institution to destroy the original document but maintain a visual record for future reference or analysis.

Unfortunately, many current security document anticopying techniques interfere with the document imaging process. These security documents can either not be imaged at all or the image produced is unreadable. Further, even when a prior art security document is capable of being scanned and stored, a significant amount of storage is wasted storing data related to the background elements. However, the data printed on the document is actually of interest and should be stored. The present invention is much more conducive to imaging. This is apparently due to the unusual organization of the background elements and/or the security term elements which results in the extraneous data being beyond the resolution of the scanner and therefore dropped during processing.

Figure 8:
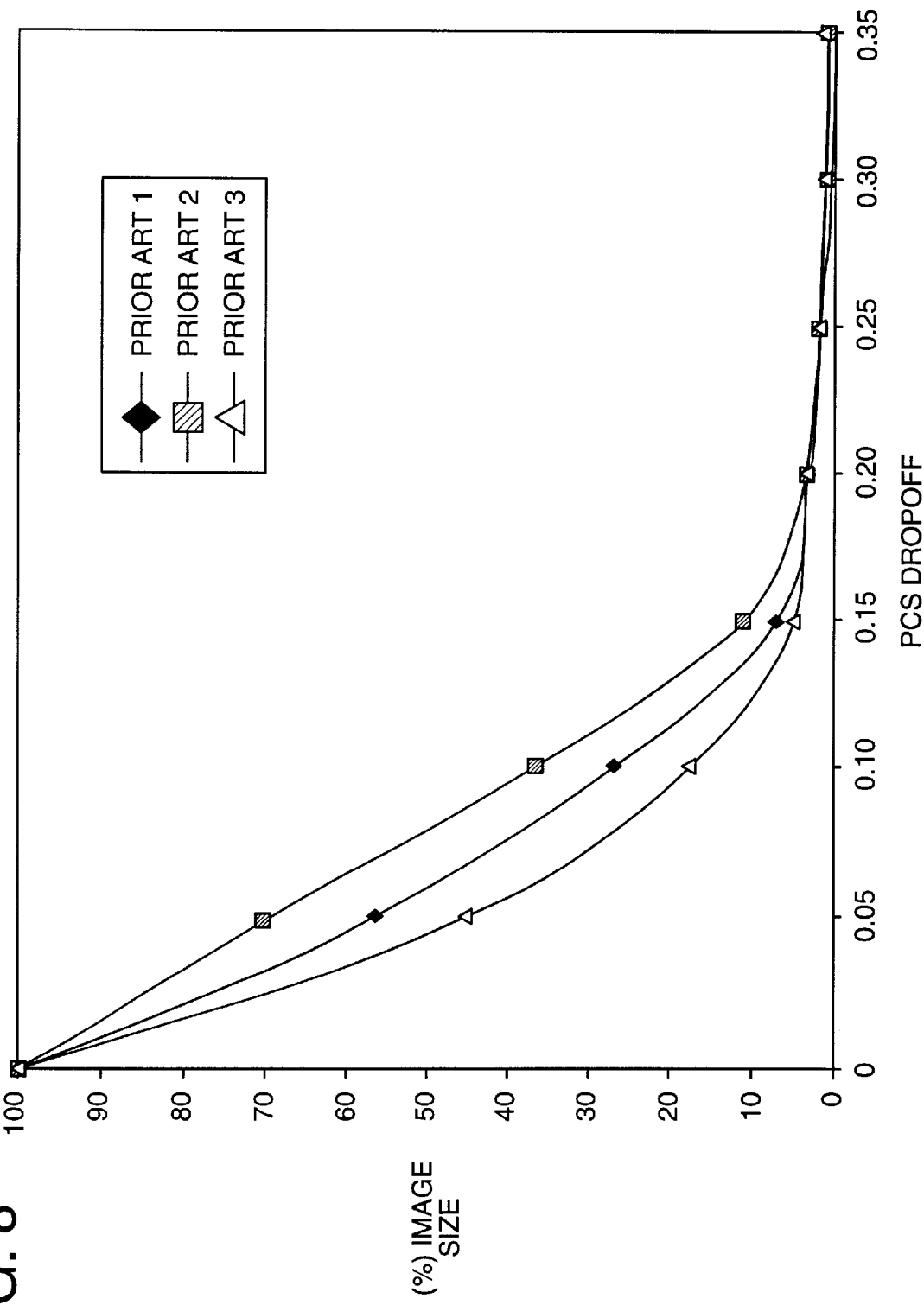
FIG. 8 is a graph of PCS Dropout vs. Image Size for three prior art backgrounds of security documents.
Figure 9:
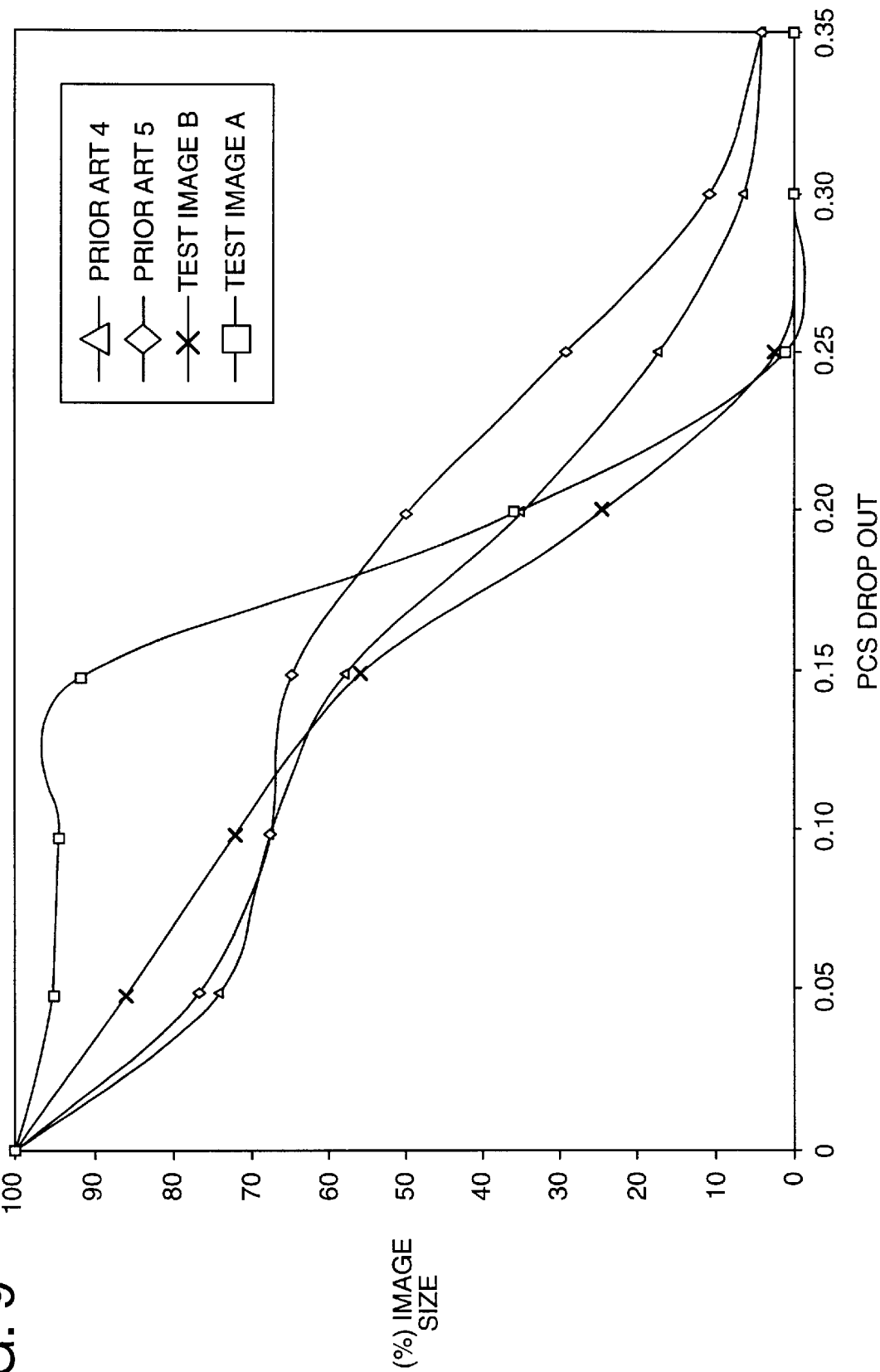
FIG. 9 is a graph of PCS Dropout vs. Image Size for two prior art backgrounds and two backgrounds of security documents according to the present invention.

Evidence of this effect is demonstrated in FIGS. 8 and 9. FIG. 8 demonstrates the results of imaging scans from three security backgrounds. Security backgrounds were analyzed by scanning them and comparing the Image Size percentage to the PCS dropoff. The Image Size percentage is calculated as the percentage of image pixels which are recorded by the imager. When the image size is zero, no pixels are being recorded by the imager. PCS (Print Contrast Signal) is determined as the difference in reflectance values between the background and the image. A formula for defining "PCS" is: $PCS=(R_L-R_D) \div R_L$, where "$R_L$" is the reflectance of the light elements (usually the background) and "$R_D$" is the reflectance of the dark elements (usually the image). PCS "Drop Out" or "Dropoff" is that PCS value for which elements with a higher PCS are retained in the image and those with a lower PCS are not retained in the image ("dropped out").

For imaging technology, the Image Size percentage of a security background will preferably go to about zero at a particular PCS dropoff setting. In other words, the imager will not record the security background at a given PCS dropoff setting. This is advantageous for two reasons. First, if the security image is removed it will not interfere with the imaging of other data on the document. Secondly, eliminating the security background in the image reduces the amount of storage space needed for each document. There are currently two PCS dropoff settings being used by the majority of banking institutions. NCR and IBM imagers use a 0.30 PCS dropoff. The Unisys imager uses a 0.20 PCS dropoff. Therefore, the Image Size percentage of an "imaging friendly" security background will preferably go to zero at a PCS dropoff setting of 0.20 to 0.30. In addition, it is believed that maintaining a high Image Size percentage up to the imager's PCS dropoff setting results in better copy protection. Therefore, a preferred curve for an "imaging friendly" security background in FIGS. 8 and 9 will stay high until it approaches a PCS dropoff of 0.20. Then, it will drop quickly to zero.

In FIG. 8, "Prior Art 1," "Prior Art 2," and Prior Art 3" are backgrounds using variations of the "big dot-little dot" technique in which security elements are larger in size than the background elements. The elements are organized in a grid-shaped array. Note that the Image Size percentages of these backgrounds drop rapidly as the PCS dropoff is increased. Also, the Image Size percentages of these backgrounds do not go completely to zero until the PCS dropoff is about 0.35. Therefore, these prior art backgrounds would not be preferred for imaging because some data is still being recorded by the imager at PCS dropoff settings of 0.20 to 0.30. In addition, the early drop in Image Size percentage indicates that these prior art backgrounds do not result in good copy protection.

FIG. 9 demonstrates the results of imaging scans from four security backgrounds. "Prior Art 4" and "Prior Art 5" are backgrounds using variations of the "moire effect" technique in which elements are arranged in a flowing, non-repetitive pattern. Note that these backgrounds retain a higher Image Size percentage longer than the other prior art backgrounds. However, also note that the Image Size percentage of "Prior Art 4" and "Prior Art 5" do not go to zero at PCS dropoff settings between 0.20 and 0.30. Therefore, these prior art backgrounds also would not be preferred for imaging because data is still being recorded by the imager at PCS dropoff settings of 0.20 to 0.30.

FIG. 9 also contains data from two security backgrounds organized according to the present invention. Both the background elements and the security term elements of "Test Image A" are organized in a non-orthogonal, repetitive pattern. The background elements are organized in a hexagonal pattern, while the security term elements are organized as approximately equilateral triangles. Such a pattern is illustrated in FIG. 10. "Test Image B" uses the same pattern as "Test Image A" but also includes a camouflage pattern.

"Test Image A" demonstrates improved results over the prior art backgrounds. Note that the Image Size percentage of "Test Image A" goes to zero at a PCS dropoff setting of about 0.25. Also, note that the Image Size percentage of "Test Image A" remains high until it approaches a PCS dropoff setting of 0.20. "Test Image B" shows similar improved results over the prior art backgrounds, although the Image Size percentage for "Test Image B" does not remain as high as "Test Image A." Therefore, the data shown in FIGS. 8 and 9 clearly demonstrate the improved performance of the security background of the present invention over prior art backgrounds with regards to imaging.

The array of the present invention is a multi-frequency screen. That is, the measured line frequency of the document will vary depending on the direction of measurement. For example, a line frequency of 65 lines per inch may be calculated for a document of the present invention. But when the document is turned 90 degrees, a line frequency of 130 lines per inch will now be calculated.

Having described the improved security document of the present invention in detail and by reference to different embodiments thereof, it will be apparent that certain modifications and variations are possible without departing from the scope of the invention defined in the appended claims.

What is claimed is:

1. A security document comprising a substrate having a top surface for carrying printed indicia, said top surface including:

background printed matter printed on said top surface, said background printed matter made up of a pattern of background elements; and a security term composed of a pattern of security term elements printed on said top surface of said substrate, wherein said background elements are arranged in an array of background elements positioned at respective apexes of a plurality of substantially equilateral triangles, said background elements are further arranged in said array of background elements such that said respective apexes of said plurality of substantially equilateral triangles are positioned at respective apexes of a plurality of substantially equilateral hexagons to define said plurality of substantially equilateral hexagons, and said background elements and said security term elements are selected and arranged such that said background elements and said security term elements are not readily duplicated in conjunction with one another by a color copier, whereby, upon copying of said security document, a visually perceptible security term is produced on the copy.

2. A security document as claimed in claim 1 wherein said background elements are further arranged such that selected ones of said respective apexes are positioned at respective centers of respective ones of said plurality of substantially equilateral hexagons.

3. A security document as claimed in claim 1 wherein each of said background elements are positioned at said respective apexes of said plurality of substantially equilateral triangles.

4. A security document as claimed in claim 1 wherein:

said security term elements are arranged in an array of security term elements positioned at respective apexes of an additional plurality of substantially equilateral triangles, and said security term elements are further arranged in said array of security term elements such that said respective apexes of said additional plurality of substantially equilateral triangles are positioned at respective apexes of an additional plurality of substantially equilateral hexagons to define said additional plurality of substantially equilateral hexagons.

5. A security document as claimed in claim 4 wherein each of said security term elements are positioned at said respective apexes of said additional plurality of substantially equilateral triangles.

6. The security document of claim 1 wherein said security term is a cancellation term.

7. The security document of claim 1 further comprising a camouflage pattern on said top surface.

8. The security document of claim 7 wherein said camouflage pattern is produced by areas on said top surface in which there are no background elements or security term elements.

9. The security document of claim 8 wherein said camouflage pattern is further defined by a pattern of camouflage elements in said areas.

10. The security document of claim 1 wherein said background printed matter is made up of a pattern of background elements of substantially the same size.

11. The security document of claim 1 wherein said security term is made up of a pattern of security term elements of substantially the same size.

12. The security document of claim 1 wherein said security term elements and said background elements are selected from a group consisting of a printed dot, a cluster of dots, and a line segment.

13. The security document of claim 12 wherein each of said background elements is a printed dot.

14. The security document of claim 12 wherein each of said security term elements is a printed dot.

15. The security document of claim 1 wherein at least one of the sizes of said background elements and said security term elements and the positions of said background elements and said security term elements are varied to produce a graded screen.

16. A security document comprising a substrate having a top surface for carrying printed indicia, said top surface including:

background printed matter printed on said top surface, said background printed matter made up of a pattern of background elements; and a security term composed of a pattern of security term elements printed on said top surface of said substrate, wherein said security term elements are arranged in an array of security term elements positioned at respective apexes of a plurality of substantially equilateral triangles, said security term elements are further arranged in said array of security term elements such that said respective apexes of said plurality of substantially equilateral triangles are positioned at respective apexes of a plurality of substantially equilateral hexagons to define said plurality of substantially equilateral hexagons, and said background elements and said security term elements are selected and arranged such that said background elements and said security term elements are not readily duplicated in conjunction with one another by a color copier, whereby, upon copying of said security document, a visually perceptible security term is produced on the copy.

17. A method of producing a security document comprising the steps of:

providing a substrate having a top surface for carrying printed indicia;

printing background printed matter on said top surface, said background printed matter made up of a pattern of background elements; and printing a security term composed of a pattern of security term elements on said top surface of said substrate, wherein said background elements are arranged in an array of background elements positioned at respective apexes of a plurality of substantially equilateral triangles, said background elements are further arranged in said array of background elements such that said respective apexes of said plurality of substantially equilateral triangles are positioned at respective apexes of a plurality of substantially equilateral hexagons to define said plurality of substantially equilateral hexagons, and said background elements and said security term elements are selected and arranged such that said background elements and said security term elements are not readily duplicated in conjunction with one another by a color copier, whereby, upon copying of said security document, a visually perceptible security term is produced on the copy.

* * * * *